3,190,764
METHOD OF BONDING A RUBBERY COMPOSITION TO A REINFORCING ELEMENT
James A. Cardina, Akron, Ohio, assignor to The Goodyear Tire & Rubber Company, Akron, Ohio, a corporation of Ohio
No Drawing. Filed June 28, 1961, Ser. No. 120,197
5 Claims. (Cl. 117—62.2)

This invention relates to a method of improving the adhesive bond between a polyester reinforcing cord and a rubber vulcanized into bonded relationship with the cord.

A polyester cord is difficult to bond to rubber because of the nature of the surface of the cord. Unless a good bond is developed between the cord and the rubber, pneumatic tires made of rubber and reinforced with polyester cord will not give many miles of trouble-free service.

It is the purpose of this invention to develop a method of bonding a polyester cord to rubber so that the bond will be retained when subjected to high temperature and stress of the nature developed, for example, in pneumatic tires when operated at speeds encountered by travel on a turnpike.

A simplified flow diagram of the process of this invention is as follows:

Pre-dip adhesive comprising:
(1) Polyepoxide
(2) Heat-convertible aldehyde resin
(3) Diene rubber latex
↓
Polyester cord coated with pre-dip adhesive
↓
Immobilize adhesive coat by removal of water at a temperature insufficient to cause a substantial reaction of the adhesive components
↓
Second dip adhesive comprising:
(1) Components chemically reactive with components of pre-dip
↓
Second dip applied to pre-dip coated cord
↓
Heat to convert components of pre- and second-dips into adhesive bond
↓
Encase coated cord in rubber
↓
Heat to vulcanize rubber and bond to cord It has now been discovered that the bonding of polyester cord to rubber may be greatly improved when using conventional adhesive compositions normally used in a first or pre-dip application, followed by a second dip application, if the chemical reactivity of the first adhesive composition is preserved until the second dip has been applied. A means of preserving the chemical reactivity of the first dip is to treat the first dip with heat sufficient only to immobilize the adhesive composition or solidify the composition so that it tends to remain in place while the cord is being treated with the second adhesive. This immobilization and preservation of the chemical reactivity of the first adhesive prevents a blending or mixing or dilution of the first adhesive with the second adhesive. The present invention insures a concentration of the polyepoxide at or near the surface of the reinforcing element where it remains to develop maximum adhesion in combination with a second adhesive layer.

It has been discovered that optimum adhesive values are not developed unless the first adhesive is immobilized and the chemical reactivity preserved as described. It is preferred to immobilize the first adhesive composition by subjecting the adhesive to heat at about 72° F. for about 2 to 5 minutes or under such conditions of heating as to drive off enough water, in the case of an adhesive emulsion, to solidify the adhesive but not to dry the adhesive at such a high temperature as to materially change the chemical composition of the adhesive.

The first or pre-dip adhesive composition, Example 1 below, that responds in a most unexpected manner when immobilized on the surface of the cord being treated, is a composition comprising an epoxy resin and a rubber latex modified with the reaction product of a polyhydric alcohol and an aldehyde. It is observed that when an adhesive composition containing 3% epoxy resin of the nature hereinafter described and 5% of a synthetic rubber latex modified with the reaction product of resorcinol and formaldehyde is applied to a polyester cord in amounts sufficient to wet the surface thereof with the adhesive composition and the cord is then dried at about 72° F. for 2 minutes which, under these conditions is sufficient to immobilize the adhesive to the extent that it retains its identity on the surface of the cord and does not tend to become mingled or blended with the second dip and the cord is then treated with a 20% solution of a second adhesive composition, Example 2 below, comprising a synthetic rubber latex modified with the reaction product of resorcinol and formaldehyde, which second dip is then dried at 350° F. for about 2 minutes to about 5 minutes, an adhesive bond measured in pounds at 250° F. of 19.3 is developed, when the cord is vulcanized in a rubber stock compounded in accordance with the following recipe:

Ingredients: Parts by weight
Natural rubber _____ 100.00
Zinc oxide _____ 3.00
Carbon black _____ 29.80
Stearic acid _____ 2.00
Pine tar _____ 7.00
Accelerator (Altax—i.e., benzothiazole disulfide) _____ 1.25
Sulfur _____ 3.00
Accelerator activator (diphenylguanidine) __ 0.15
Antioxidant A (a commercial, non-staining antioxidant comprising a mixture of alkylated phenols or styrenated phenols) ____ 1.00

The pre-dip adhesive composition may be made in accordance with the following formula:

| Example | 1 (8% Solids) | 2 (20% Solids) |
|---|---|---|
| Resorcinol | 0.51 | 2.03 |
| Formaldehyde (37%) | 0.65 | 2.62 |
| Sodium Hydroxide (10%) | 0.50 | 2.00 |
| Terpolymer rubber latex of Styrene/Butadiene-1.3/Vinylpyridine 15/70/15 (41%) | 3.55 | 14.20 |
| Copolymer Rubber Latex of Styrene/Butadiene-1,3 (39%) | 6.85 | 27.40 |
| Polyepoxide (Eponite 100) | 3.00 | |
| Water | 84.94 | 51.75 |
| | 100.00 | 100.00 |

The 20% solids latex mixture of Example 2 was made by adding the resorcinol to the water and then the formaldehyde was added to the water, followed by the addition of sodium hydroxide and then the rubber latex. It is preferred to use sodium hydroxide as the alkali to catalyze the reaction of the phenol with the aldehyde to bring about the formation of the water-soluble and thermal-settable resin. The sodium hydroxide is used in an amount sufficient to develop a pH in the finished adhesive dip of between 9.0 to 9.5. The aldehyde is preferred to be used in a molar excess ranging from 1.01 to 2.0 mols per mol of resorcinol and preferably from 1.5 to 1.7 mols of formaldehyde to 1 mol of resorcinol. The resulting reaction mixture may be aged from 1 to 24 hours.

The 8% solids adhesive mixture of Example 1 was made by taking 25 parts of the aged adhesive of Example 2 and adding thereto 3% solids of the polyepoxide and 72 parts of water. The resulting reaction mixture may be aged from 1 to 24 hours.

Under identical conditions of cord treatment, as described above with the sole exception that the first adhesive composition was not dried, but immediately after the first adhesive composition had been applied to the surface of the cord, the cord was then passed through the second adhesive composition which was then dried at 350° F. to 410° F. for 3 minutes. The cord when so treated and embedded in rubber as indicated above developed a static adhesion of 15.0#.

The tire cord used in these tests was made by first twisting 1100 denier yarn (240 filaments each) at the rate of 12 turns per inch and then twisting two of these yarns at the rate of 12 turns per inch to form a cord having a tensile of 29.4 pounds or 5.39 grams per denier, 8.3% elongation at 10 pounds and 18.3% at break. In each instance, the yarn was made of polyester fiber.

The polyester fiber is made of the well-known linear polyesters obtained by reacting glycols, such as ethylene glycol, propylene glycol and the like, with dicarboxylic acids, such as, for example, terephthalic acid, isophthalic acid, stilbenecarboxylic acid and the like. Polyesters used as reinforcing cords in accordance with the process of this invention are also known by the trade-name of Vycron, which may be produced in accordance with the disclosure set forth in U.S. Patent 2,965,613 and known by the trademark Dacron, which may be produced in accordance with the disclosure set forth in U.S. Patent 2,465,319.

Other materials which are also difficult to bond to a rubbery composition are synthetic linear polyester-forming polyamides, particularly of the type described in U.S. Patent 2,071,250–2,071,253 and 2,130,948, and particularly the aromatic polyamides, and specifically the copolymer of metaphenylene diamine and isophthalic acid. The adhesion of these polyamides to a rubber is greatly increased when treated in accordance with the process of this invention.

Any of the well-known epoxy resins may be used in combination with the resorcinol/formaldehyde/rubber latex in producing the first adhesive composition. A specific polyepoxide that may be used, and as described above, is made by reacting 3 mols of glycerol with 9 mols of an epichlorohydrin in the presence of 10 parts of diethylether solution containing about 4.5% of boron trifluoride at between 50° C. to about 75° C. for 3 hours. The resulting polyglycidyl ether has a molecular weight of about 124 and an epoxy value of 0.671 equivalence per 100 grams of polymer.

The reinforcing polyester element is first treated with the adhesive pre-dip of Example 1 by passing it into and out of a dip tank containing this first adhesive composition while maintaining the cord under a slight tension of about ½ pound to 1 pound and at a rate which will permit the cord to be wetted by the adhesive composition, for example, about 3 feet per minute.

At this point, applicant has discovered that, if the adhesive composition is immobilized or solidified by removing sufficient water at temperatures which will not substantially change the chemical composition of the adhesive composition but merely prevent this adhesive layer from being diluted by or blending into the second adhesive layer when applied to the cord by running the cord into a dip tank containing the second adhesive composition of Example 2, an improved bond is developed between the cord so treated and the rubber being reinforced thereby.

Temperatures ranging up to room temperature of 70° to 80° F. and below about 100° F. may be employed for the purpose of immobilizing the first adhesive composition. The time necessary to bring about this desired solidification or immobilization of the adhesive composition will depend upon the temperature used and the rate at which heated air is passed across the cord being dried. Generally, the drying time will range from about 1 minute to about 10 minutes and preferably it is desirable to adjust the drying conditions so that the desirable condition of the adhesive is produced between about 2 minutes and about 4 minutes. Temperatures above 100° F. and up to about 200° F. may be used if the drying time is reduced sufficiently so that the desired drying is obtained but the chemical reactivity of the adhesive is preserved. Generally, at these high temperatures the drying time ranges from about 30 seconds to about 1 minute.

A series of runs were made with the post-dip of Example 2 on a polyester cord (Vitel E) treated first with the pre-dip of Example 1 and then to determine the effect time and temperature have on drying the pre-dip.

| Example | Pre-Dip Festoon | | Final Dip | | Adhesion, 250°, Lbs. |
|---|---|---|---|---|---|
| | Time | Temp., ° F. | Drying Time, Min. | Temp., ° F. | |
| 3 | 3 Min | 75 | 3 | 410 | 22.1 |
| 4 | 3 Min | 150 | 3 | 410 | 19.0 |
| 5 | 3 Min | 250 | 3 | 410 | 18.7 |
| 6 | 3 Min | 300 | 3 | 410 | 17.7 |
| 7 | 3 Min | 400 | 3 | 410 | 16.5 |
| 8 | 0 to 5 sec | RT | 3 | 410 | 16.8 |
| 9 | 1 Min | RT | 3 | 410 | 20.0 |
| 10 | 4 Min | RT | 3 | 410 | 17.6 |
| 11 | 15 Min | RT | 3 | 410 | 17.3 |
| 12 | 45 Sec | 125 | 3 | 410 | 19.2 |
| 13 | 50 Sec | 125 | 3 | 410 | 19.9 |
| 14 | 1 Min | 125 | 3 | 410 | 18.2 |
| 15 | 1.2 Min | 125 | 3 | 410 | 17.4 |
| 16 | 1.5 Min | 125 | 3 | 410 | 14.6 |
| 17 | 2.0 Min | 125 | 3 | 410 | 11.7 |
| 18 | No Treatment | | 3 | 410 | 12.4 |

The solids of epoxy resins in the first dip may range from about .5 to 10% and preferably from about 1.5 to 5%. Likewise, the solids of the resorcinol/formaldehyde/rubber latex composition may range from about 1% to about 20% and preferable from about 4% to about 6%. The total amount of solids deposited on the cord surface when passed through a dip tank containing the first adhesive composition may range from about 0.1 to about 2% by weight of the cord. The ratio of resin to rubber latex may range from 1/10 to 2.5/10.

The total solids of the resorcinol/formaldehyde/rubber latex reaction product in the second adhesive composition may range from about 6% to about 30% and preferably from about 15% to about 22%. The amount of resorcinol/formaldehyde/rubber latex reaction product solids picked up on the surface of the cord when passed through a dip tank containing the second adhesive composition may range from about 1% to about 5%.

In preparing the 20% solids resorcinol/formaldehyde/rubber latex adhesive composition, the resorcinol/formaldehyde condensate makes up at least 5% by weight of the total solids of the composition and generally between about 10% to about 50%. The rubber latex portion of this adhesive composition is preferably employed in an amount from about 60% to about 90% of the total solids. The rubber latex may be any diene type of rubbery polymer resulting from the polymerization of a conjugated diene such as butadiene-1,3 with vinylpyridine or with a vinyl aromatic monomer such as styrene. Other examples of polymerizable monomeric compounds include the various diene hydrocarbons such as methyl-2-butadiene-1,3(isoprene), 2,3-dimethyl butadiene-1,3, pentadiene-1,3(piperylene), as well as the chlorinated butadienes, such as 2-chlorobutadiene-1,3 and the like. The polymerizable material, as is well known, may comprise a mixture of a diene hydrocarbon, such as butadiene-1,3 and another polymerizable compound which is capable of forming a rubbery copolymer with the diene hydrocarbon and especially the copolymerizable monomers containing a vinyl (CH$_2$=CH—) group. Typical monomers containing this group copolymerizable with diene hydrocarbons are the aryl olefins, including in addition to styrene, vinyl toluene, alpha methyl styrene, and vinyl naphthalene. The alpha methylene carboxylic acids and their esters, nitriles and amides may be used, including such monomers as acrylic acid, methyl acrylate, methyl methacrylate, acrylonitrile, methacrylonitrile, and methacrylamide.

Well-known commercial types of synthetic rubber latices are the aqueous emulsion polymerizates resulting from the polymerization of, for example, a mixture of 75 parts of butadiene-1,3 and 25 parts of styrene, known as GR–S latex, the aqueous emulsion polymerizates resulting from the polymerization of a mixture, for example, comprising 70 parts of butadiene-1,3 and 30 parts of acrylonitrile to form the rubbery copolymer known as GR–N latex and the aqueous emulsion polymerizate of 2-chlorobutadiene-1,3 known as neoprene latex or GR–M. Thus, the term "rubber latex" is used in a generic sense to include the natural rubbers and the synthetic rubbers, particularly the diene rubbers which in most instances are susceptible of vulcanization with sulfur and possess the property of elasticity characterized by the ability to return to substantially their original dimensions after being stretched at least 200%.

The improved static adhesion developed when employing the process of this invention is observed when the rubber stock being reinforced is compounded with conventional compounding ingredients, including antioxidants, loading agents, reinforcing agents, accelerators, and vulcanizing agents.

The compounded rubber may be vulcanized in the presence of the reinforcing cord at temperatures ranging above 200° F. and up to 350° F. for 5 to 60 minutes, depending upon the accelerators used.

Pneumatic test tires made in a conventional manner with conventional SBR rubber stock and reinforced with polyester cord treated with the adhesive composition of Example 13 described above failed after 5026 minutes under 100% overload at 600 r.p.m., compared to failure after 1789 minutes of a similar test tire reinforced with the same cord but treated in a conventional manner with the adhesive of Example 18. Similarly, a Mallory cord fatigue test (as described in U.S. Patent 2,412,524) developed 62,000 cycles to failure versus 17,000, and a dead load (3 pounds @ 250° F.) adhesion of 212 minutes versus 56 minutes for the same conditions used in Examples 13 and 18, respectively, for bonding polyester cord to rubber.

While certain representative embodiments and details have been shown for the purpose of illustrating the invention, it will be apparent to those skilled in this art that various changes and modifications may be made therein without departing from the spirit or scope of the invention.

What is claimed is:

1. A process for treating a reinforcing element of a polyester resin to improve its ability to adhere to a rubbery composition which comprises treating the reinforcing element with an adhesive composition comprising a dispersion of a polyepoxide, the components of a heat-convertible phenol/aldehyde resin, and a diene rubber latex to deposit on said element from about .5 to about 10% solids of said polyepoxide, and from about 1% to about 20% solids of said resin and rubber latex wherein the ratio of resin to rubber latex ranges from 1/10 to 2.5/10, heating the adhesive composition at a temperature insufficient to cause a substantial reaction of the components of said adhesive composition but at a temperature sufficient to solidify the adhesive composition, the components remaining substantially unreacted because of the absence of an epoxy curing agent, applying a second adhesive composition containing components including a heat-convertible aldehyde resin and a rubber latex chemically reactive with the chemically reactive components of the said first adhesive composition to the reinforcing element and then heating the reinforcing element at a tempearture from about 350° F. to about 410° F. for from about 2 to about 5 minutes in order to convert the components of both adhesive compositions into a homogeneous resinous mass.

2. A process for treating a reinforcing element of a polyester resin to improve its ability to adhere to a rubbery composition which comprises treating the reinforcing element with an adhesive composition comprising a dispersion of a polyepoxide, the components of a heat-convertible phenol/aldehyde resin and a vinylpyridine/diene rubber latex to deposit on said element from about .5 to about 10% solids of said polyepoxide, and from about 1% to about 20% solids of said resin and rubber latex wherein the ratio of resin to rubber latex ranges from 1/10 to 2.5/10, heating the adhesive composition at a temperature below about 100° F. long enough to solidify the adhesive composition, the components remaining substantially unreacted because of the absence of an epoxy curing agent, applying a second adhesive composition containing components including a heat-convertible aldehyde resin and a ruber latex chemically reactive with the chemically reactive components of said first adhesive composition to the reinforcing element and then heating the reinforcing element at a temperature from about 350° F. to about 410° F. for about 2 to about 5 minutes in order to convert the components into a homogeneous resinous mass.

3. A process for treating a reinforcing element of a polyester resin to improve its ability to adehere to a rubbery composition which comprises treating the reinforcing element with an adhesive composition containing about 3% of a polyepoxide and about 5% of the components of a heat-convertible resorcinol/formaldehyde resin and a vinylpyridine/diene rubber latex, the ratio of a resin to rubber latex ranging from about 1/10 to 2.5/10, heating the adhesive composition at a temperature insufficient to cause a substantial reaction of the components of the said adhesive composition but at a temperature sufficient to solidify the adhesive composition, the components remaining substantially unreacted because of the absence of an epoxy curing agent, applying a second adhesive composition containing 20% solids of resorcinol/formaldehyde and vinylpyridine/diene rubber latex, and then heating the composite structure at temperatures substantially above 100° F. to convert the adhesive components into a homogeneous resinous mass.

4. A process for treating a reinforcing element of a polyester resin to improve its ability to adhere to a rubbery composition comprising treating the reinforcing element with a first adhesive composition comprising an aqueous dispersion of a polyepoxide and a resorcinol/formaldehyde/rubber latex reaction product to deposit on said element from about .5 to about 10% solids of said polyepoxide, and from about 1% to about 20% solids of said reaction product, heating the first adhesive composition on said reinforcing element at temperature below about 100° F. but at a temperature sufficient to solidify the adhesive composition, the components remaining substantially unreacted because of the absence of an epoxy curing agent, depositing a second adhesive composition on said first dried adhesive composition comprising a resorcinol/formaldehyde/rubber latex reaction product, and then heating the composite structure at a temperature of about 350° F.

5. A process for treating a polyester cord to improve its ability to adhere to a rubber composition which comprises treating the polyester cord with a composition containing about 3% of a polyepoxide and about 5% of resorcinol/formaldehyde/rubber latex reaction product wherein the ratio of resin to rubber latex ranges from 1/10 to 2.5/10, heating the adhesive composition at a temperature below about 100° F. but at a temperature sufficient to solidify the adhesive composition, the components remaining substantially unreacted because of the absence of an epoxy curing agent, depositing on the first adhesive composition a second adhesive composition comprising about 20% resorcinol/formaldehyde/rubber latex reaction product solids and then heating the composite structure at temperatures substantially above 100° F.

References Cited by the Examiner

UNITED STATES PATENTS

| | | | |
|---|---|---|---|
| 2,902,398 | 9/59 | Schroeder | 117—76 |
| 2,978,784 | 4/61 | Koch | 117—76 |
| 3,036,948 | 5/62 | Danielson | 156—330 |

RICHARD D. NEVIUS, *Primary Examiner.*

UNITED STATES PATENT OFFICE
CERTIFICATE OF CORRECTION

Patent No. 3,190,764  June 22, 1965

James A. Cardina

It is hereby certified that error appears in the above numbered patent requiring correction and that the said Letters Patent should read as corrected below.

Column 2, line 28, after "350° F." insert -- to 410° F. --.

Signed and sealed this 8th day of March 1966.

(SEAL)
Attest:

ERNEST W. SWIDER
Attesting Officer

EDWARD J. BRENNER
Commissioner of Patents